United States Patent
Young et al.

(10) Patent No.: US 10,592,234 B2
(45) Date of Patent: Mar. 17, 2020

(54) PENDING MERGE CONFLICT NOTIFICATION

(71) Applicant: Microsoft Technology Licensing, LLC, Redmond, WA (US)

(72) Inventors: Kenneth Lawrence Young, Sammamish, WA (US); Ahmed Mohamed Metwally, Bothell, WA (US); Jeffrey Walter Kelly, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/969,644

(22) Filed: May 2, 2018

(65) Prior Publication Data

US 2019/0339964 A1  Nov. 7, 2019

(51) Int. Cl.
*G06F 8/71* (2018.01)
*G06F 9/448* (2018.01)
*G06F 8/73* (2018.01)

(52) U.S. Cl.
CPC .................. *G06F 8/71* (2013.01); *G06F 8/73* (2013.01); *G06F 9/448* (2018.02)

(58) Field of Classification Search
CPC ....................................................... G06F 8/71
See application file for complete search history.

(56) References Cited

U.S. PATENT DOCUMENTS

| | | | | |
|---|---|---|---|---|
| 8,364,690 | B2 * | 1/2013 | Gonzalez | G06F 11/0709 707/758 |
| 8,826,222 | B2 * | 9/2014 | Bak | G06F 8/71 717/101 |
| 9,158,658 | B2 * | 10/2015 | Bigwood | G06F 11/3624 |
| 9,430,229 | B1 * | 8/2016 | Van Zijst | G06F 9/3844 |
| 9,436,460 | B2 * | 9/2016 | Bantupalli | G06Q 10/101 |
| 9,442,719 | B2 * | 9/2016 | Bantupalli | G06Q 10/101 |

(Continued)

OTHER PUBLICATIONS

Dewan, Prasun, and Rajesh Hegde. "Semi-synchronous conflict detection and resolution in asynchronous software development." ECSCW 2007. Springer, London, 2007. 159-178. (Year: 2007).*
Hegde, Rajesh, and Prasun Dewan. "Connecting programming environments to support ad-hoc collaboration." Proceedings of the 2008 23rd IEEE/ACM International Conference on Automated Software Engineering. IEEE Computer Society, 2008. (Year: 2008).*

(Continued)

*Primary Examiner* — Matthew J Brophy
(74) *Attorney, Agent, or Firm* — Alleman Hall Creasman & Tuttle LLP

(57) ABSTRACT

A first client computing device, including a display and a processor. The processor may execute a distributed source code authoring management system client configured to communicate with a codebase host server. The processor may output a graphical user interface (GUI) of the distributed source code authoring management system client and may receive a first edit to a code file in an editor window included in the GUI. The editor window may provide real-time mark-up of the code file. In response to the first edit, the processor may transmit change set information including the first edit to a codebase host server. The processor may receive, from the codebase host server, a first conflict notification indicating that the first edit and a second edit to the code file have a pending merge conflict. The processor may output the first conflict notification to the display for display in the editor window.

18 Claims, 7 Drawing Sheets

(56) References Cited

U.S. PATENT DOCUMENTS

| | | | | |
|---|---|---|---|---|
| 9,454,459 | B2* | 9/2016 | Bigwood | G06F 11/3624 |
| 9,575,764 | B1* | 2/2017 | Turner | G06F 9/3844 |
| 9,940,219 | B2* | 4/2018 | Bigwood | G06F 11/3624 |
| 10,289,407 | B1* | 5/2019 | Turner | G06F 8/71 |
| 2004/0261013 | A1* | 12/2004 | Wynn | G06Q 10/10 |
| | | | | 715/229 |
| 2007/0283321 | A1* | 12/2007 | Hegde | G06F 8/71 |
| | | | | 717/110 |
| 2009/0216714 | A1* | 8/2009 | Gonzalez | G06F 11/0709 |
| 2009/0327358 | A1* | 12/2009 | Lukiyanov | G06F 16/48 |
| 2012/0180024 | A1* | 7/2012 | Gonzalez | G06F 8/71 |
| | | | | 717/109 |
| 2013/0036400 | A1* | 2/2013 | Bak | G06F 8/71 |
| | | | | 717/101 |
| 2013/0185252 | A1* | 7/2013 | Palmucci | G06F 16/93 |
| | | | | 707/608 |
| 2015/0106790 | A1* | 4/2015 | Bigwood | G06F 11/3624 |
| | | | | 717/127 |
| 2015/0355995 | A1* | 12/2015 | Bigwood | G06F 11/3624 |
| | | | | 717/126 |
| 2016/0357659 | A1* | 12/2016 | Bigwood | G06F 11/3624 |
| 2018/0004507 | A1* | 1/2018 | Aijaz | G06F 8/71 |
| 2018/0062860 | A1* | 3/2018 | Gajjala | H04L 9/3268 |

OTHER PUBLICATIONS

Padhye, Rohan, Senthil Mani, and Vibha Singhal Sinha. "NeedFeed: taming change notifications by modeling code relevance." Proceedings of the 29th ACM/IEEE international conference on Automated software engineering. ACM, 2014. (Year: 2014).*

"International Search Report and Written Opinion Issued in PCT Application No. PCT/US19/029029", Date: Sep. 24, 2019, 14 Pages.

Brun, et al., "Proactive Detection of Collaboration Conflicts", In Proceedings of the 19th ACM SIGSOFT Symposium and the 13th European Conference on Foundations of Software Engineering, Sep. 5, 2011, pp. 168-178.

Estler, et al., "Unifying Configuration Management with Merge Conflict Detection and Awareness Systems", In Proceedings of 22nd Australian Software Engineering Conference, Jun. 4, 2013, pp. 201-210.

Guzzi, et al., "Supporting Developers Coordination in the IDE", In Proceedings of the 18th ACM Conference on Computer Supported Cooperative Work & Social Computing, Mar. 1, 2015, pp. 518-532.

Hegde, et al., "Connecting Programming Environments to Support Ad-Hoc Collaboration", In Proceedings of the 23rd IEEE/ACM International Conference on Automated Software Engineering, Sep. 15, 2008, pp. 178-187.

* cited by examiner

PENDING MERGE CONFLICT NOTIFICATION

BACKGROUND

When two or more developers work on a code file in parallel, the edits made by the developers to the code file may conflict with each other. For example, the developers may make different edits to the same section of the code file. As another example, edits made by a developer may introduce syntax errors into the code file if they are applied along with edits made by another developer.

In existing methods of addressing merge conflicts, edits made by a developer are typically checked for conflicts when that developer requests to merge the edited version of the code file with another version. However, if a merge conflict occurs after the developer has made extensive edits to the code file, reconciling those edits with edits made by other developers may be difficult and time-consuming.

SUMMARY

According to one aspect of the present disclosure, a first client computing device is provided, including a display and a processor. The processor may be configured to execute a distributed source code authoring management system client configured to communicate with a codebase host server. The processor may be further configured to output for display on the display a graphical user interface (GUI) of the distributed source code authoring management system client. The processor may be further configured to receive a first edit to a code file in an editor window included in the GUI. The editor window may be configured to provide real-time mark-up of the code file. In response to the first edit, the processor may be further configured to transmit change set information including the first edit to a codebase host server. The processor may be further configured to receive, from the codebase host server, a first conflict notification indicating that the first edit and at least a second edit to the code file have a pending merge conflict. The processor may be further configured to output the first conflict notification to the display for display in the editor window.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
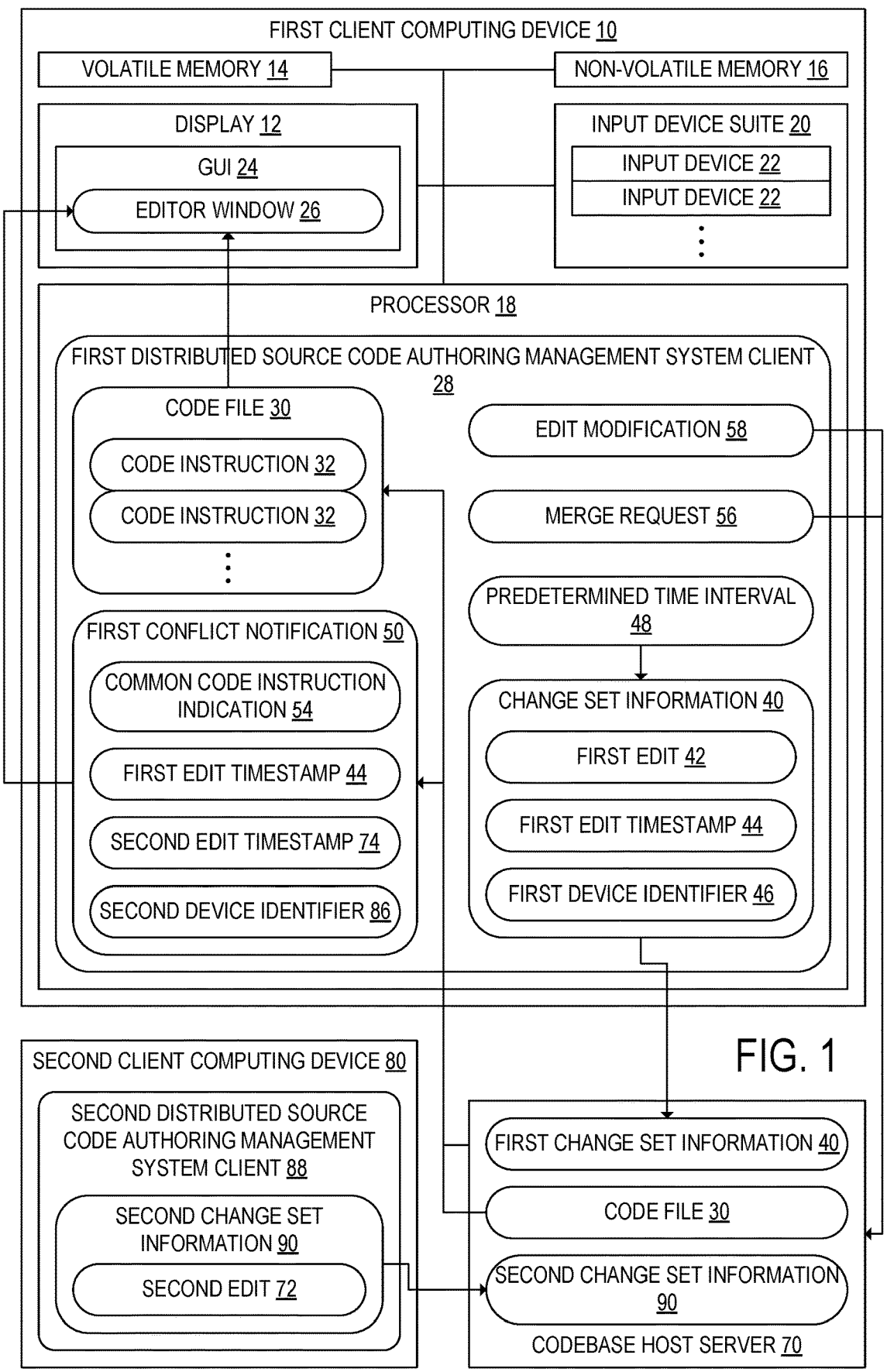
FIG. 1 shows an example first client computing device, according to one embodiment of the present disclosure.

In order to address the challenges discussed above, a first client computing device 10 is provided, as shown in the example embodiment of FIG. 1. The first client computing device 10 may include a display 12, volatile memory 14, non-volatile memory 16, a processor 18, and/or an input device suite 20 including one or more input devices 22. The one or more input devices 22 may include, for example, one or more of a keyboard, a mouse, a trackpad, a touchscreen, a microphone, a camera, an inertial motion unit, a global positioning system (GPS) unit, and/or some other input device 22. In addition to the display 12, the first client computing device 10 may further include one or more other output devices, such as a speaker, a haptic feedback unit, or some other output device.

The processor 18 may be configured to execute a first distributed source code authoring management system client 28. The processor 18 may be further configured to output a graphical user interface (GUI) of the distributed source code authoring management system client 28 for display on the display 12. The GUI 24 of the first distributed source code authoring management system client 28 may include an editor window 26 in which a code file 30 may be displayed. The editor window 26 may be configured to provide real-time mark-up of the code file 30 as the user inputs code into the editor window. For example, the editor window 26 may provide mark-up such as syntax coloring, error and warning marks, brace matching, line numbers, change tracking, etc. to the text that the user inputs into the editor window.

The code file 30 may be received by the processor 18 from a codebase host server 70. In some embodiments, the code file 30 may be received via a network. The code file 30 may be stored in the non-volatile memory 16 of the first client computing device 10.

The processor 18 may be further configured to receive a first edit 42 to the code file 30 in the editor window 26 included in the GUI 24 of the first distributed source code authoring management system client 28. The first edit 42 may be an edit to one or more code instructions 32 included in the code file 30. For example, the first edit 42 may include an insertion of one or more code instructions 32, a deletion of one or more code instructions 32, and/or a complete or partial replacement of one or more code instructions 32. Additionally, the first edit 42 may include one or more changes to one or more non-instruction portions of the code file 30, such as comments and/or whitespace.

The processor 18 may be further configured to transmit first change set information 40 including the first edit 42 to the codebase host server 70. In some embodiments, the first change set information 40 may be transmitted to the codebase host server 70 in response to the processor 18 receiving the first edit 42. The first change set information 40 may further include a first edit timestamp 44 of the first edit 42, which may indicate a time at which the first edit 42 was performed at the editor window 26 or saved in the non-volatile memory 16. Additionally or alternatively, the first change set information 40 may further include a first device identifier 46 of the first client computing device 10. The first device identifier 46 may indicate that the first change set information 40 is sent to the codebase host server 70 by the first client computing device 10, rather than some other computing device.

The codebase host server 70 may receive the first change set information 40 from the first client computing device 10. In addition, the codebase host server 70 may receive second change set information 90 including a second edit 72 that has a pending merge conflict with the first edit 42. The pending merge conflict may be a potential merge conflict between the first edit 42 and the second edit 72 detected by the codebase host server 70. For example, the first edit 42 may change the type of a variable, and the second edit 72 may add a line of code in which the variable is used with its type unchanged. As another example, the first edit 42 may delete the definition of a function that is called in a line added in the second edit 72. If the first edit 42 and the second edit 72 were both applied to the code file 30, one or more errors would be introduced into the code file.

Figure 2:
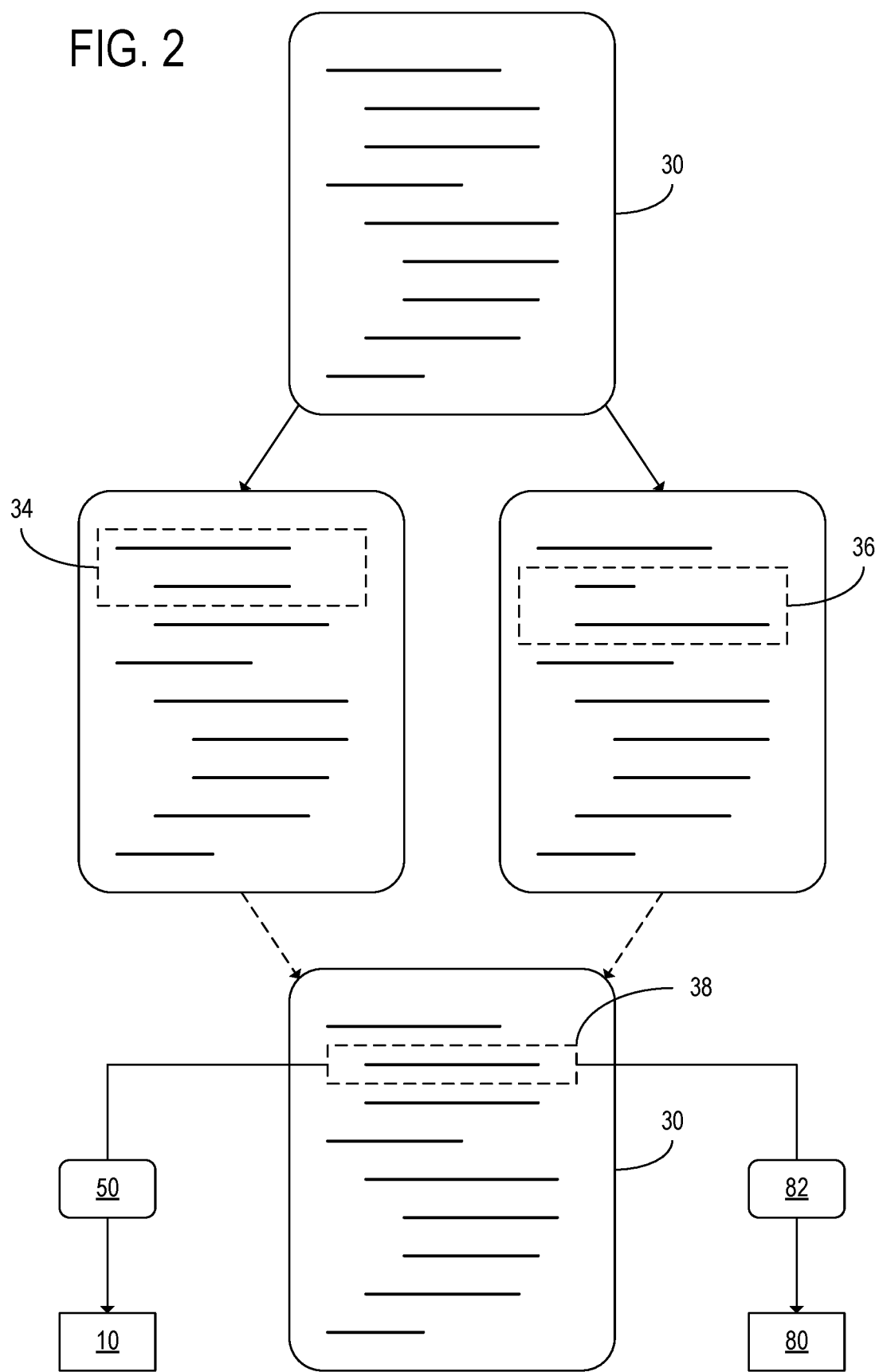
FIG. 2 shows an example of a pending merge conflict to a first edit and a second edit to a code file, according to the embodiment of FIG. 1.

The processor 18 of the first client computing device 10 may be further configured to receive, from the codebase host server 70, a first conflict notification 50 indicating that the first edit 42 and at least the second edit 72 to the code file 30 have a pending merge conflict. The first conflict notification 50 may be sent prior to applying the first edit 42 or the second edit 72 to the source code. An example of pending merge conflict detection and conflict notification generation is shown in FIG. 2. As shown in FIG. 2, the first edit 42 to the code file 30 is to a first set 34 of one or more code instructions 32 and the second edit 72 to the code file 30 is to a second set 36 of one or more code instructions 32. At least one common code instruction 38 is included in the first set 34 of one or more code instructions 32 and the second set 36 of one or more code instructions 32. Since applying both the first edit 42 and the second edit 72 to the code file 30 would result in at least one code instruction 32 included in the first edit 42 and/or the second edit 72 being overwritten, the codebase host server 70 may determine that a pending merge conflict exists between the first edit 42 and the second edit 72. The codebase host server 70 may therefore transmit a first conflict notification 50 to the first client computing device 10.

In some embodiments, the second edit 72 to the code file 30 may be performed at a second client computing device 80. The second edit 72 may be performed at a second distributed source code authoring management system client 88 executed by a processor of the second computing device 80. In such embodiments, the codebase host server 70 may additionally transmit a second conflict notification 82 to the second client computing device 80. Alternatively, the codebase host server 70 may, in some embodiments, be the second client computing device 80 at which the second edit 72 is performed. In such embodiments, the second client computing device 80 may generate a conflict notification that is both sent to the first client computing device 10 as the first conflict notification 50 and output at the second client computing device 80 as the second conflict notification 82.

Returning to FIG. 1, the first conflict notification 50 may include a common code instruction indication 54 that indicates one or more code instructions 32 at which the first edit 42 and the second edit 72 intersect. The first conflict notification 50 may further indicate a type of pending merge conflict, such as a syntax error or an undefined variable, that would occur if the first edit 42 and the second edit 72 were both applied. In embodiments in which the first change set information 40 includes a first edit timestamp 44 of the first edit 42, the first conflict notification 50 may further include the first edit timestamp 44 and a second edit timestamp 74 of the second edit 72. In some embodiments, the first edit timestamp 44 and the second edit timestamp 74 may be used to determine whether the first edit 42 or the second edit 72 has priority. In one example, a developer who sees another edit with an earlier timestamp may be able to save time by not trying to make a change to the source code 30 that has already been made by another developer.

Figure 3:
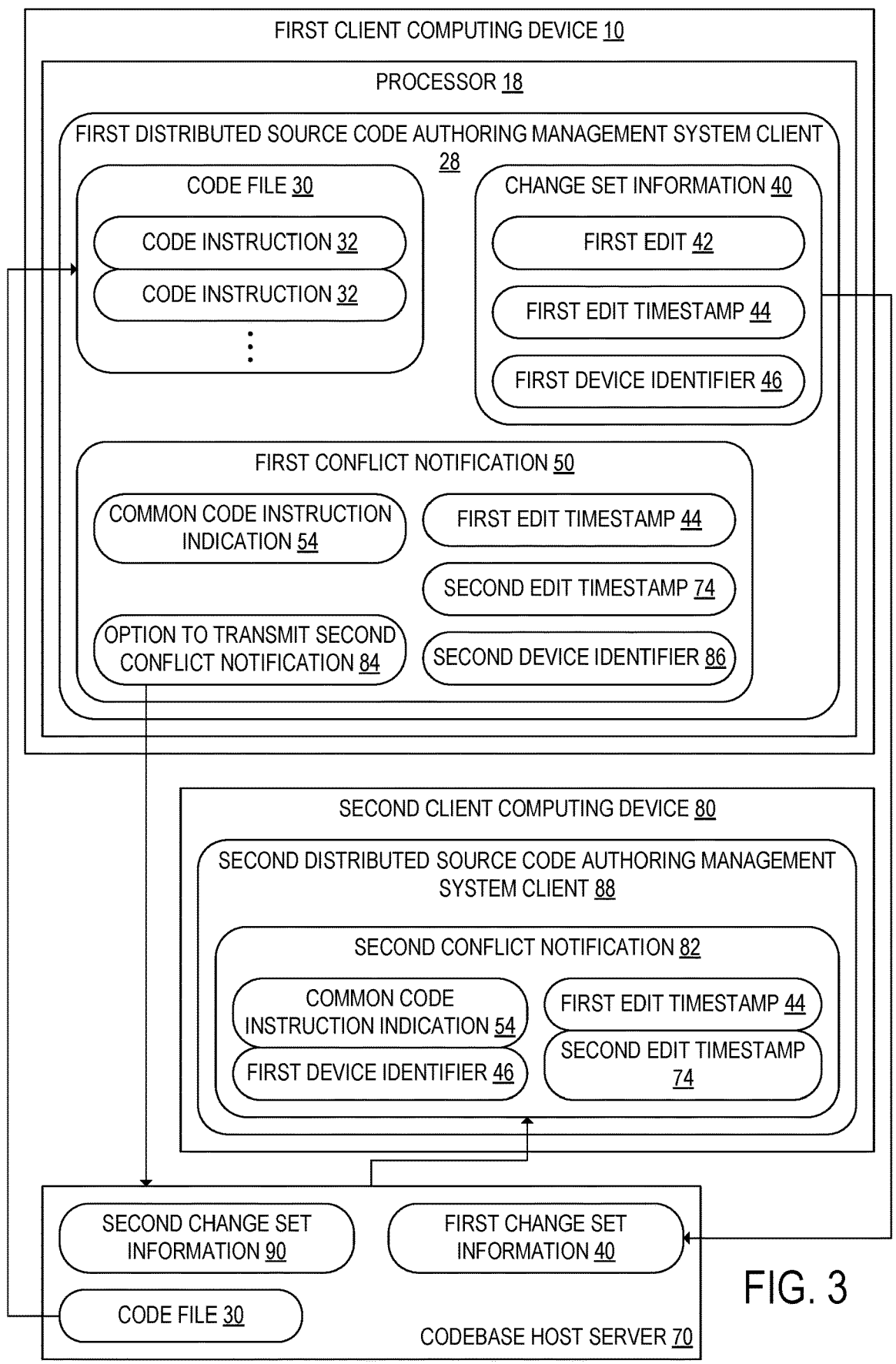
FIG. 3 shows an example first client computing device and second client computing device, according to the embodiment of FIG. 1.

The first conflict notification 50 may further include a second device identifier 86 of the second client computing device 80. The second device identifier 86 may indicate that the second edit 72 was performed at the second client computing device 80. In some embodiments, as shown in FIG. 3, the first conflict notification 50 may further include an option 84 to transmit a second conflict notification 82 to the second client computing device 80. Similarly to the first conflict notification 50, the second conflict notification 82 may include a common code instruction indication 54 that indicates one or more code instructions 32 at which the first edit 42 and the second edit 72 intersect. The second conflict notification 82 may additionally or alternatively include the first edit timestamp 44 and/or the second edit timestamp 74. In some embodiments, the second conflict notification 82 may include the first device identifier 46.

Sending the first conflict notification 50 to the first client computing device 10 may allow pending merge conflicts to be identified earlier in the process of editing the code file 30. In addition, the first conflict notification 50 and/or the second conflict notification 82 may facilitate communication between a first developer who made the first edit 42 and a second developer who made the second edit 72. Thus, time that would otherwise be spent reconciling the first edit 42 with the second edit 72 may be saved.

Figure 4:
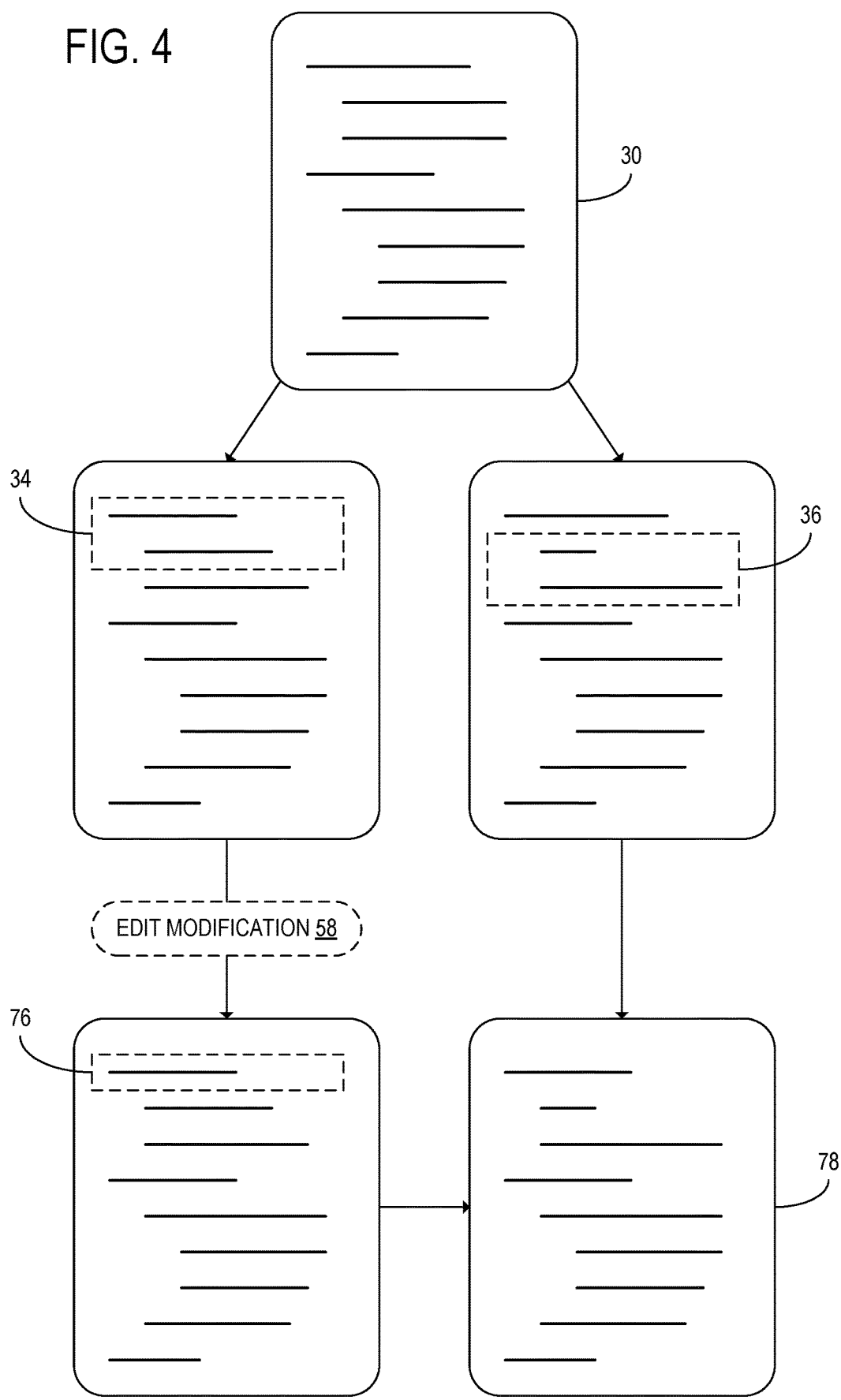
FIG. 4 shows an example of pending merge conflict resolution via edit modification, according to the embodiment of FIG. 1.

Returning to FIG. 1, the processor 18 may be further configured to apply an edit modification 58 to the first edit 42 and/or the second edit 72 such that the first edit 42 and the second edit 72 do not have the pending merge conflict after the edit modification 58 is applied. For example, as shown in the example of FIG. 4, the edit modification 58 may modify the first edit 42 and/or the second edit 72 such that there are no common code instructions 38 that are included in both the first set 34 of one or more code instructions 32 and the second set 36 of one or more code instructions 32. In the example of FIG. 4, the edit modification 58 is applied to the first edit 42 and restricts the first set 34 of one or more code instructions 32 to code instructions 32 not included in the second set 36. The processor may be further configured to transmit the edit modification 58 to the codebase host server 70. At the codebase host server 70, as shown in FIG. 4, the first edit 42 and the second edit 72 are applied to the code file 30 after the first edit has been modified to generate a merged code file 78. Although the edit modification 58 is applied to the first edit 42 in the example of FIG. 4, an edit modification 58 may additionally or alternatively be applied to the second edit 72.

Returning to FIG. 1, the first change set information 40 may, in some embodiments, be transmitted from the first client computing device 10 to the codebase host server 70 at a predetermined time interval 48. Thus, the first change set information 40 may be checked for pending merge conflicts at the predetermined time interval 48 as the first developer edits the code file 30. The predetermined time interval 48 may begin, in some embodiments, when the code file 30 is opened in the editor window 26. In other embodiments, the processor 18 may begin the predetermined time interval 48 when the code file 30 is edited. The codebase host server 70 may additionally or alternatively receive the second change set information 90 from the second client computing device 80 at a predetermined interval, which may be the same as or different from the predetermined time interval 48 of the first client computing device 10.

In some embodiments, the processor 18 may be further configured to transmit a merge request 56 to the codebase host server 70. The merge request 56 may, for example, be a commit or pull request. The merge request 56 may include an instruction to apply the first edit 42 to the code file 30. In response to receiving the merge request 56, the codebase host server 70 may apply the first edit 42 to the code file 30 and may additionally inhibit the second edit 72 from being applied to the code file 30. Alternatively, application of the first edit 42 may be inhibited. When application of the first edit 42 or the second edit 72 is inhibited, the codebase host server 70 may transmit a notification to the respective client computing device indicating that application of the edit was inhibited. The processor 18 may transmit the first change set information 40 to the codebase host server 70 prior to transmitting the merge request 56. Thus, a pending merge conflict between the first edit 42 and the second edit 72 may be detected before a developer attempts to merge the edits.

Figure 5:
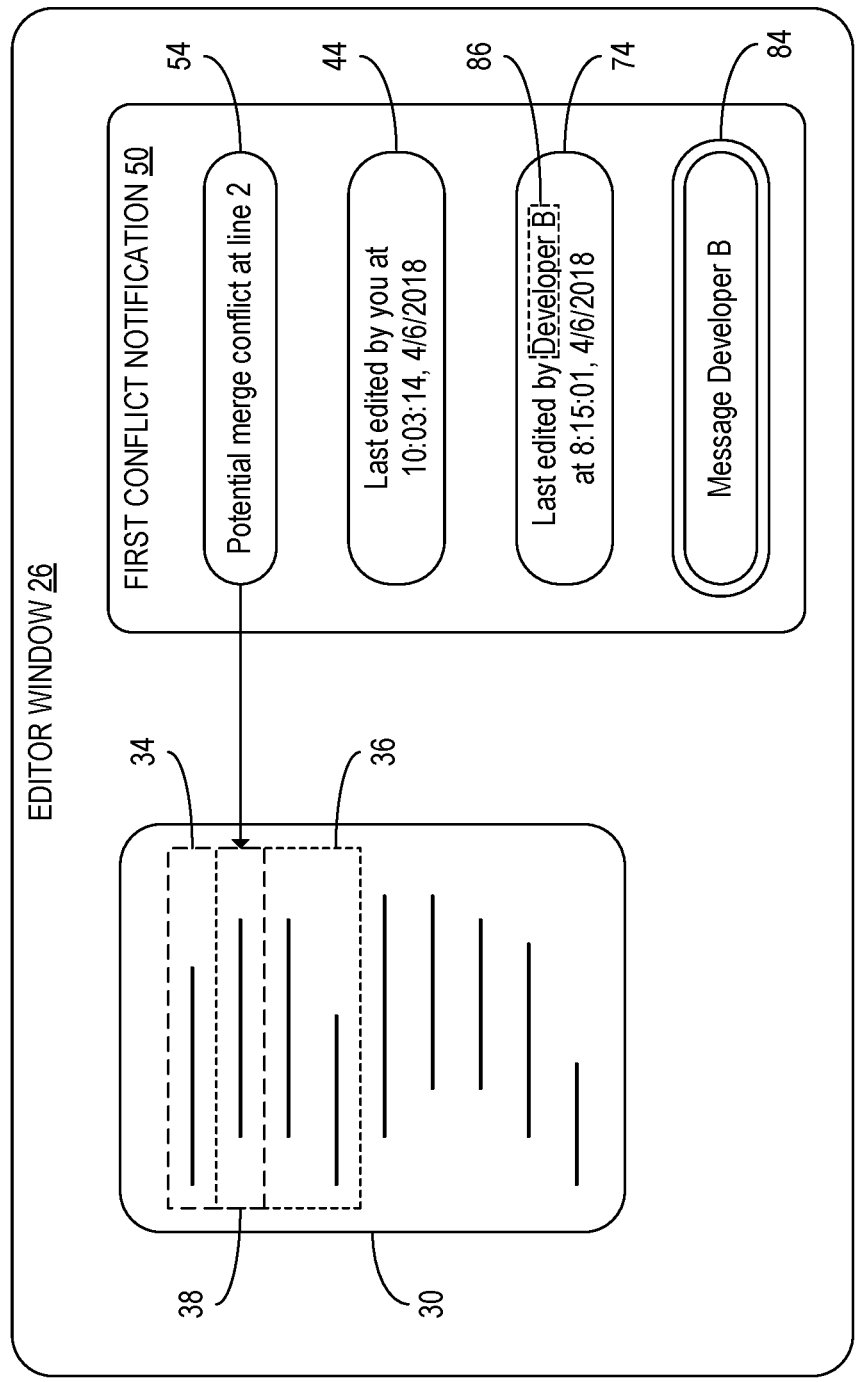
FIG. 5 shows an example pending merge conflict notification, according to the embodiment of FIG. 1.

FIG. 5 shows an example of the editor window 26 of the GUI 24, including the code file 30 and the first conflict notification 50. In the code file 30 as shown in FIG. 5, the first set 34 of one or more code instructions 32 and the second set 36 of one or more code instructions overlap at a common code instruction 38 in line 2 of the code file 30. The first conflict notification 50 therefore includes a common code instruction indication 54 that indicates, "Pending merge conflict at line 2." The first conflict notification 50 further includes a first edit timestamp 44 that indicates "Last edited by you at 10:03:14, 4/6/2018." The first conflict notification 50 further includes a second edit timestamp 74 that also includes a second device identifier 86. The second edit timestamp 74 indicates, "Last edited by Developer B at 8:15:01, 4/6/2018." In addition, the first conflict notification 50 includes an option 84 to transmit a second conflict notification 82 to a second client computing device 80. The option 84 indicates, "Message Developer B." When the option 84 is selected using an input device 22 of the first client computing device 10, the processor 18 may transmit the second conflict notification 82 to the second client computing device 80.

Figure 6:
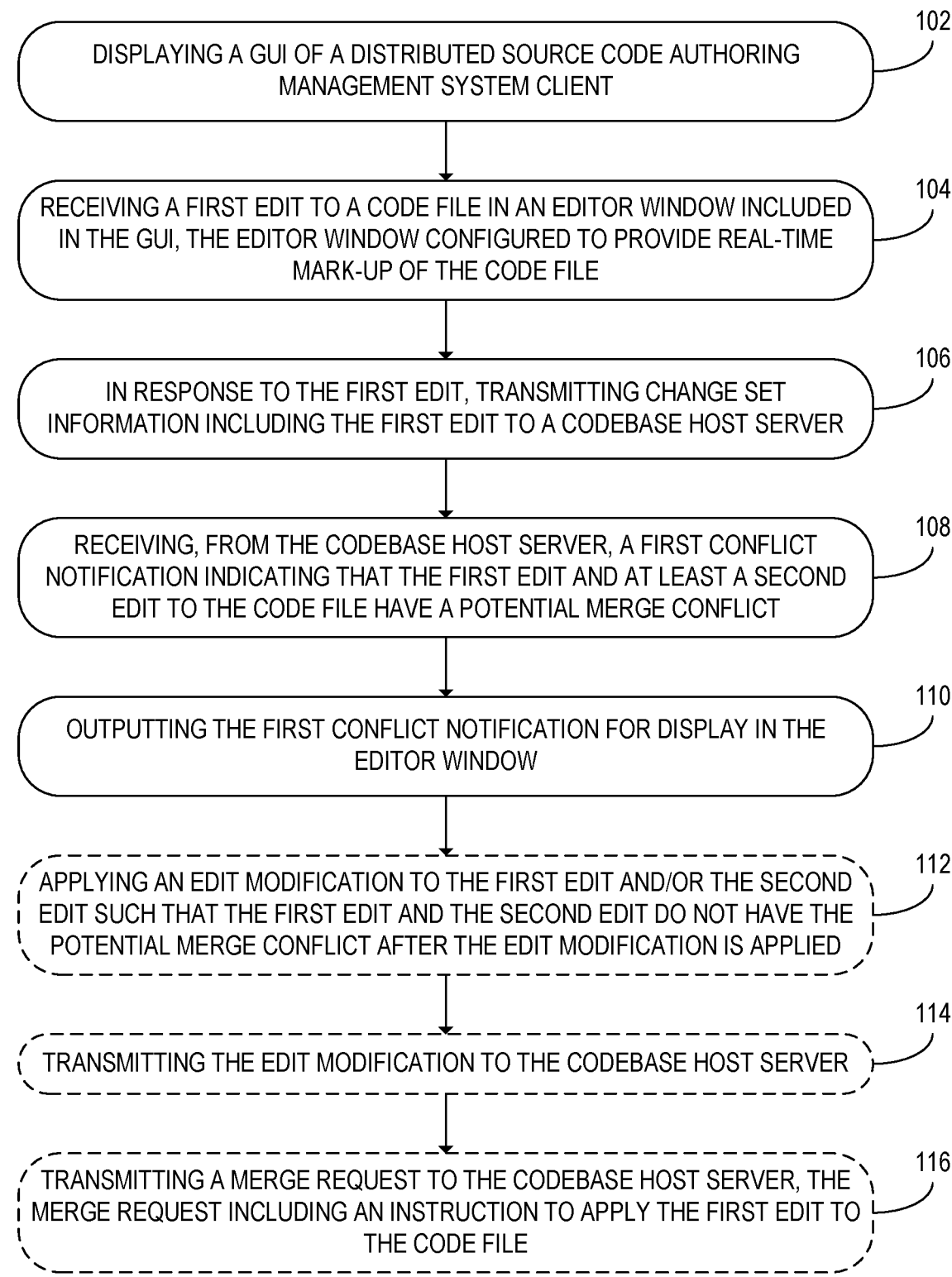
FIG. 6 shows a method that may be used with a first client computing device, according to the embodiment of FIG. 1.

FIG. 6 shows a flowchart of a method 100 for use with a first client computing device, which may in some embodiments be the first client computing device 10 of FIG. 1. At step 102, the method 100 may include displaying a graphical user interface (GUI) of a first distributed source code authoring management system client. The GUI of the distributed source code management system client may be displayed on a display of the first client computing device. At step 104, the method 100 may further include receiving a first edit to a code file in an editor window included in the GUI of the first distributed source code authoring management system client. The editor window may be configured to provide real-time mark-up of the code file, for example, by indicating one or more syntactic properties of the code instructions included in the code file as the code file is edited. In some embodiments, the first edit to the code file may be an edit to a first set of one or more code instructions.

At step 106, the method 100 may further include transmitting change set information including the first edit to a codebase host server. The change set information may be transmitted to the codebase host server in response to the first edit. In some embodiments, the change set information may be transmitted to the codebase host server at a predetermined time interval. The change set information may, in some embodiments, include a first edit timestamp of the first edit, which may indicate a time at which the first edit was made, saved, or transmitted to the codebase host server.

At step 108, the method 100 may further include receiving, from the codebase host server, a first conflict notification indicating that the first edit and at least a second edit to the code file have a pending merge conflict. In some embodiments, the second edit to the code file may be performed at a second client computing device. At step 110, the method 100 may further include outputting the first conflict notification for display in the editor window. In embodiments in which the second edit is performed at a second client computing device, the first conflict notification may include a second device identifier of the second client computing device. In such embodiments, the first client notification may further include an option to transmit a second conflict notification to the second client computing device. Additionally or alternatively, in embodiments in which the change set information includes a first edit timestamp, the first conflict notification may include the first edit timestamp and a second edit timestamp of the second edit. Additionally or alternatively, when the first edit to the code file is to a first set of one or more code instructions and the second edit to the code file is to a second set of one or more code instructions, the first conflict notification may include an indication of at least one common code instruction. The at least one common code instruction may be included in the first set of one or more code instructions and the second set of one or more code instructions.

In some embodiments, the method 100 may further include, at step 112, applying an edit modification to the first edit and/or the second edit such that the first edit and the second edit do not have the pending merge conflict after the edit modification is applied. The edit modification may be applied to the one or more common code instructions. In such embodiments, the method 100 may further include, at step 114, transmitting the edit modification to the codebase host server. The codebase host server may then apply the first edit and the second edit to the code file.

In some embodiments, the method 100 may further include, at step 114, transmitting a merge request to the codebase host server. The merge request may include an instruction to apply the first edit to the code file. In such embodiments, the change set information may be transmitted to the codebase host server prior to transmitting the merge request. Thus, the first edit and the second edit may be checked for pending merge conflicts prior to attempts to merge the first edit and the second edit.

Although the systems and methods described above are described with reference to a distributed source code authoring management system, systems and methods for detecting merge conflicts between edits to documents other than source code are also contemplated. For example, the systems and methods described above may also be used with image files, sound files, video files, text files that are not source code, or other types of files.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
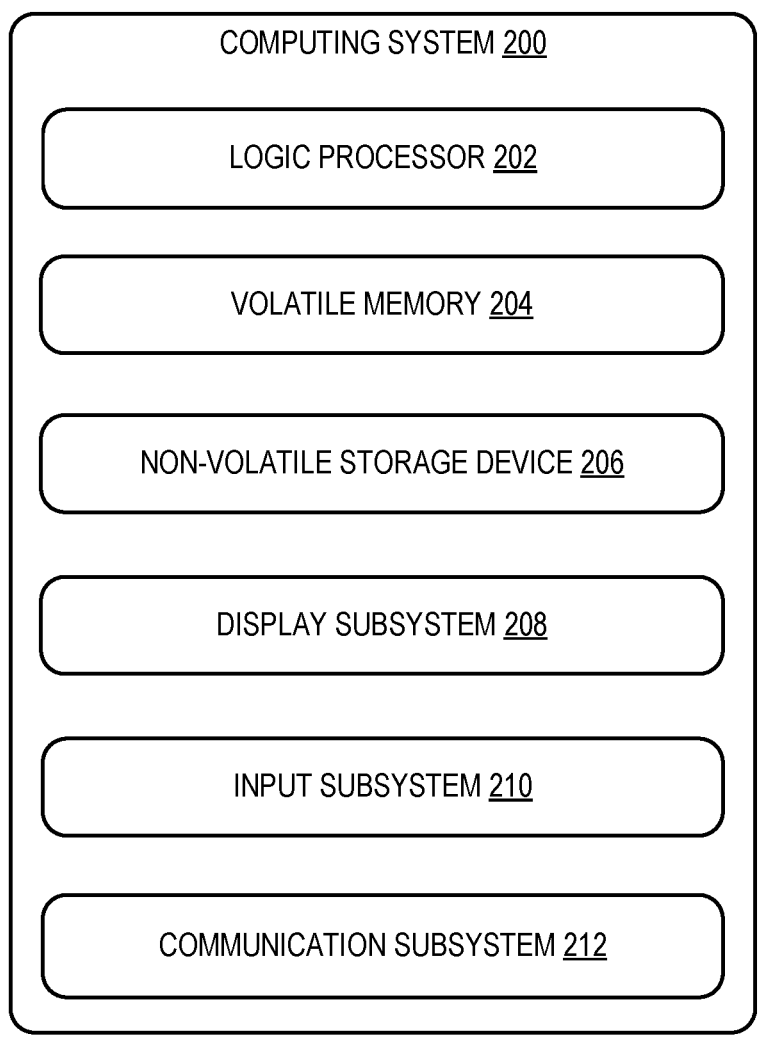
FIG. 7 shows a schematic representation of an example computing system, according to one embodiment of the present disclosure.

FIG. 7 schematically shows a non-limiting embodiment of a computing system 200 that can enact one or more of the methods and processes described above. Computing system 200 is shown in simplified form. Computing system 200 may, for example, embody the first client computing device 10 of FIG. 1, or may instead embody some other computing system. Computing system 200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented/virtual reality devices.

Computing system 200 includes a logic processor 202, volatile memory 204, and a non-volatile storage device 206. Computing system 200 may optionally include a display subsystem 208, input subsystem 210, communication subsystem 212, and/or other components not shown in FIG. 7.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 202 may include one or more physical processors (hardware) configured to execute software instructions. Additionally or alternatively, the logic processor 202 may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor 202 optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 200 implemented to perform a particular function. In some cases, a program may be instantiated via logic processor 202 executing instructions held by non-volatile storage device 206, using portions of volatile memory 204. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 208 may be used to present a visual representation of data held by non-volatile storage device 206. As the herein described methods and processes change the data held by the non-volatile storage device 206, and thus transform the state of the non-volatile storage device 206, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem 210 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; and/or any other suitable sensor.

When included, communication subsystem 212 may be configured to communicatively couple computing system 200 with one or more other computing devices. Communication subsystem 212 may include wired and/or wireless communication devices compatible with one or more different communication protocols. As non-limiting examples, the communication subsystem 212 may be configured for communication via a wireless telephone network, or a wired or wireless local- or wide-area network. In some embodiments, the communication subsystem 212 may allow computing system 200 to send and/or receive messages to and/or from other devices via a network such as the Internet.

According to one aspect of the present disclosure, a first client computing device is provided, including a display and a processor. The processor may be configured to execute a distributed source code authoring management system client configured to communicate with a codebase host server. The processor may be further configured to output for display on the display a graphical user interface (GUI) of the distributed source code authoring management system client. The processor may be further configured to receive a first edit to a code file in an editor window included in the GUI. The editor window may be configured to provide real-time mark-up of the code file. The processor may be further configured to, in response to the first edit, transmit change set information including the first edit to the codebase host server. The processor may be further configured to receive, from the codebase host server, a first conflict notification indicating that the first edit and at least a second edit to the code file have a pending merge conflict. The processor may be further configured to output the first conflict notification to the display for display in the editor window.

According to this aspect, the second edit to the code file may be performed at a second client computing device.

According to this aspect, the codebase host server may be the second client computing device.

According to this aspect, the first conflict notification may further include a second device identifier of the second client computing device and an option to transmit a second conflict notification to the second client computing device.

According to this aspect, the first edit to the code file may be to a first set of one or more code instructions and the second edit to the code file may be to a second set of one or more code instructions. The first conflict notification may include an indication of at least one common code instruction included in the first set of one or more code instructions and the second set of one or more code instructions.

According to this aspect, the change set information may be transmitted to the codebase host server at a predetermined time interval.

According to this aspect, the change set information may further include a first edit timestamp of the first edit.

According to this aspect, the first conflict notification may include the first edit timestamp and a second edit timestamp of the second edit.

According to this aspect, the change set information may further include a first device identifier of the first client computing device.

According to this aspect, the processor may be further configured to transmit a merge request to the codebase host server. The merge request may include an instruction to apply the first edit to the code file.

According to this aspect, the processor may be further configured to transmit the change set information to the codebase host server prior to transmitting the merge request.

According to this aspect, the processor may be further configured to apply an edit modification to the first edit and/or the second edit such that the first edit and the second edit do not have the pending merge conflict after the edit modification is applied. The processor may be further configured to transmit the edit modification to the codebase host server.

According to another aspect of the present disclosure, a method for use with a first client computing device is provided. The method may include displaying a graphical user interface (GUI) of a distributed source code authoring management system client. The method may further include receiving a first edit to a code file in an editor window included in the GUI, the editor window configured to provide real-time mark-up of the code file. The method may further include, in response to the first edit, transmitting change set information including the first edit to a codebase host server. The method may further include receiving, from the codebase host server, a first conflict notification indicating that the first edit and at least a second edit to the code file have a pending merge conflict. The method may further include outputting the first conflict notification for display in the editor window.

According to this aspect, the second edit to the code file may be performed at a second client computing device.

According to this aspect, the first edit to the code file may be to a first set of one or more code instructions and the second edit to the code file may be to a second set of one or more code instructions. The first conflict notification may include an indication of at least one common code instruction included in the first set of one or more code instructions and the second set of one or more code instructions.

According to this aspect, the change set information may be transmitted to the codebase host server at a predetermined time interval.

According to this aspect, the method may further include transmitting a merge request to the codebase host server. The merge request may include an instruction to apply the first edit to the code file.

According to this aspect, the change set information may be transmitted to the codebase host server prior to transmitting the merge request.

According to this aspect, the method may further include applying an edit modification to the first edit and/or the second edit such that the first edit and the second edit do not have the pending merge conflict after the edit modification is applied. The method may further include transmitting the edit modification to the codebase host server.

According to another aspect of the present disclosure, a first client computing device is provided. The first client computing device may include a processor configured to receive a first edit to a code file. The first edit to the code file may be to a first set of one or more code instructions. The processor may be further configured to transmit change set information including the first edit to a second client computing device. The processor may be further configured to receive, from the second client computing device, a first conflict notification indicating that the first edit and at least a second edit to the code file have a pending merge conflict. The second edit to the code file may be to a second set of one or more code instructions. The first conflict notification may include an indication of at least one common code instruction included in the first set of one or more code instructions and the second set of one or more code instructions. The processor may be further configured to output the first conflict notification.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A first client computing device comprising:
a display; and
a processor configured to:
execute a distributed source code authoring management system client configured to communicate with a codebase host server;
output for display on the display a graphical user interface (GUI) of the distributed source code authoring management system client;
receive a first edit to a code file in an editor window included in the GUI, the editor window configured to provide real-time mark-up of the code file;
in response to the first edit, transmit change set information including the first edit to the codebase host server, wherein the change set information further includes a first device identifier to which the first edit by the first client computing device is attributed and a first edit timestamp associated with the first edit;
receive, from the codebase host server, a first conflict notification indicating that the first edit attributed to the first device identifier and at least a second edit to the code file having a second edit timestamp and attributed to a second device identifier by a second client computing device have a pending merge conflict; and
output the first conflict notification to the display for display in the editor window as the real-time mark-up of the code file, the first conflict notification indicating at least a portion of the first edit attributed to the first device identifier and at least a portion of the second edit attributed to the second device identifier in conflict with each other,
wherein the second edit to the code file is indicated in the first conflict notification as having been performed at the second client computing device at a time indicated by the second edit timestamp,
wherein the first conflict notification further includes an option to transmit a second conflict notification to the second client computing device, and
wherein the second conflict notification includes a common code instruction indication that indicates one or more code instructions at which the first edit and the second edit intersect, the first edit timestamp, the second edit timestamp, and the first device identifier.

2. The first client computing device of claim 1, wherein:
the first edit to the code file is to a first set of one or more code instructions;
the second edit to the code file is to a second set of one or more code instructions; and
the first conflict notification includes an indication of at least one common code instruction included in the first set of one or more code instructions and the second set of one or more code instructions.

3. The first client computing device of claim 1, wherein the change set information is transmitted to the codebase host server at a predetermined time interval.

4. The first client computing device of claim 1, wherein the change set information further includes a first edit timestamp of the first edit.

5. The first client computing device of claim 4, wherein the first conflict notification includes the first edit timestamp and a second edit timestamp of the second edit.

6. The first client computing device of claim 1, wherein the processor is further configured to transmit a merge request to the codebase host server, the merge request including an instruction to apply the first edit to the code file.

7. The first client computing device of claim 6, wherein the processor is configured to transmit the change set information to the codebase host server prior to transmitting the merge request.

8. The first client computing device of claim 1, wherein the processor is further configured to:
apply an edit modification to the first edit and/or the second edit such that the first edit and the second edit do not have the pending merge conflict after the edit modification is applied; and
transmit the edit modification to the codebase host server.

9. A method for use with a first client computing device, the method comprising:
displaying a graphical user interface (GUI) of a distributed source code authoring management system client;
receiving a first edit to a code file in an editor window included in the GUI, the editor window configured to provide real-time mark-up of the code file;
in response to the first edit, transmitting change set information including the first edit to a codebase host server, wherein the change set information further includes a first device identifier to which the first edit by the first client computing device is attributed and a first edit timestamp associated with the first edit;
receiving, from the codebase host server, a first conflict notification indicating that the first edit attributed to the first device identifier and at least a second edit to the code file having a second edit timestamp and attributed to a second device identifier by a second client computing device have a pending merge conflict; and
outputting the first conflict notification for display in the editor window as the real-time mark-up of the code file, the first conflict notification indicating at least a portion of the first edit attributed to the first device identifier and at least a portion of the second edit attributed to the second device identifier in conflict with each other,
wherein the second edit to the code file is indicated in the first conflict notification as having been performed at the second client computing device at a time indicated by the second edit timestamp,
wherein the first conflict notification further includes an option to transmit a second conflict notification to the second client computing device, and
wherein the second conflict notification includes a common code instruction indication that indicates one or more code instructions at which the first edit and the second edit intersect, the first edit timestamp, the second edit timestamp, and the first device identifier.

10. The method of claim 9, wherein:
the first edit to the code file is to a first set of one or more code instructions;
the second edit to the code file is to a second set of one or more code instructions; and
the first conflict notification includes an indication of at least one common code instruction included in the first set of one or more code instructions and the second set of one or more code instructions.

11. The method of claim 9, wherein the change set information is transmitted to the codebase host server at a predetermined time interval.

12. The method of claim 9, further comprising transmitting a merge request to the codebase host server, the merge request including an instruction to apply the first edit to the code file.

13. The method of claim 12, wherein the change set information is transmitted to the codebase host server prior to transmitting the merge request.

14. The method of claim 9, further comprising:
applying an edit modification to the first edit and/or the second edit such that the first edit and the second edit do not have the pending merge conflict after the edit modification is applied; and
transmitting the edit modification to the codebase host server.

15. A first client computing device comprising a processor configured to:
receive a first edit to a code file, wherein the first edit to the code file is to a first set of one or more code instructions;
transmit change set information including the first edit to a second client computing device, wherein the change set information further includes a first device identifier to which the first edit by the first client computing device is attributed and a first edit timestamp associated with the first edit;
receive, from the second client computing device, a first conflict notification indicating that the first edit attributed to the first device identifier and at least a second edit to the code file having a second edit timestamp and attributed to a second device identifier by the second client computing device have a pending merge conflict, wherein:
the second edit to the code file is to a second set of one or more code instructions; and
the first conflict notification includes an indication of at least one common code instruction included in the first set of one or more code instructions and the second set of one or more code instructions, wherein the at least one common code instruction includes at least a portion of the first edit attributed to the first device identifier and at least a portion of the second edit attributed to the second device identifier in conflict with each other; and
output the first conflict notification,
wherein the second edit to the code file is indicated in the first conflict notification as having been performed at the second client computing device at a time indicated by the second edit timestamp,
wherein the first conflict notification further includes an option to transmit a second conflict notification to the second client computing device, and
wherein the second conflict notification includes a common code instruction indication that indicates one or more code instructions at which the first edit and the second edit intersect, the first edit timestamp, the second edit timestamp, and the first device identifier.

16. The first client computing device of claim 1, wherein the processor is further configured to initiate transmission of the second conflict notification to the second client computing device in response to selection of the option.

17. The method of claim 9, further comprising initiating transmission of the second conflict notification to the second client computing device in response to selection of the option.

18. The first client computing device of claim 15, wherein the processor is further configured to initiate transmission of the second conflict notification to the second client computing device in response to selection of the option.

* * * * *